Aug. 10, 1937. L. I. BILEDEOU 2,089,725
POULTRY WATERER
Filed Feb. 1, 1935
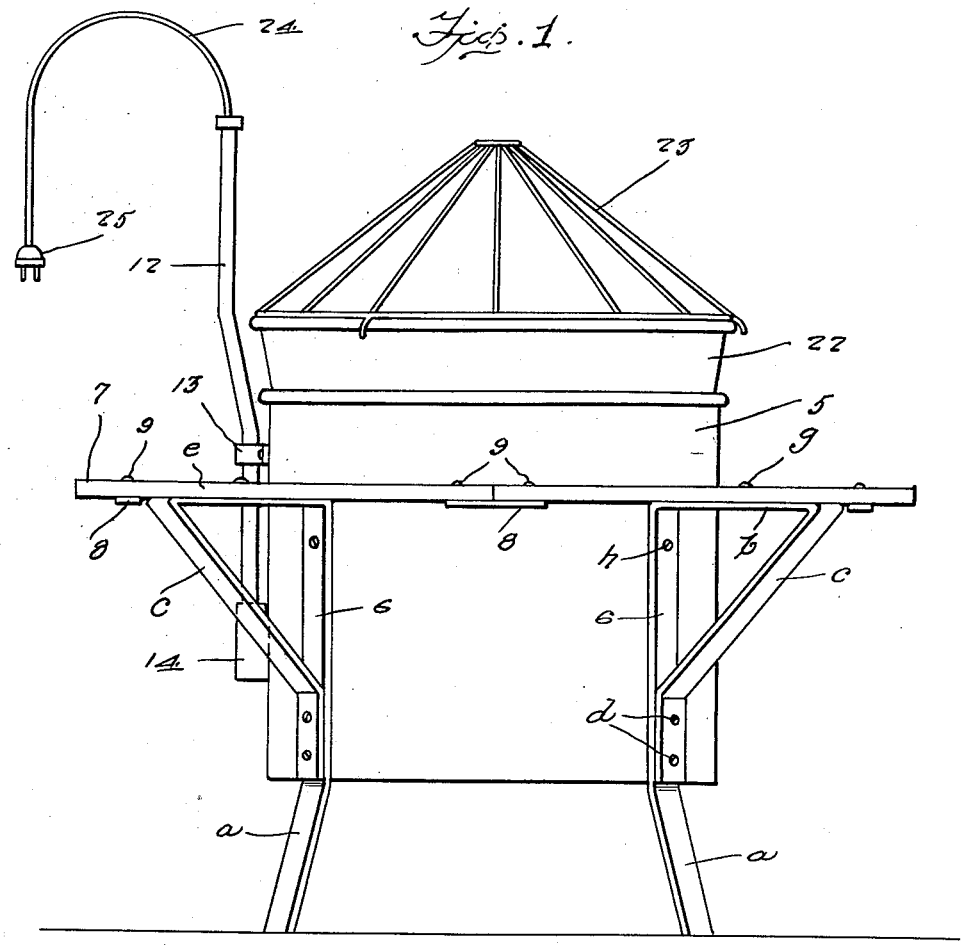
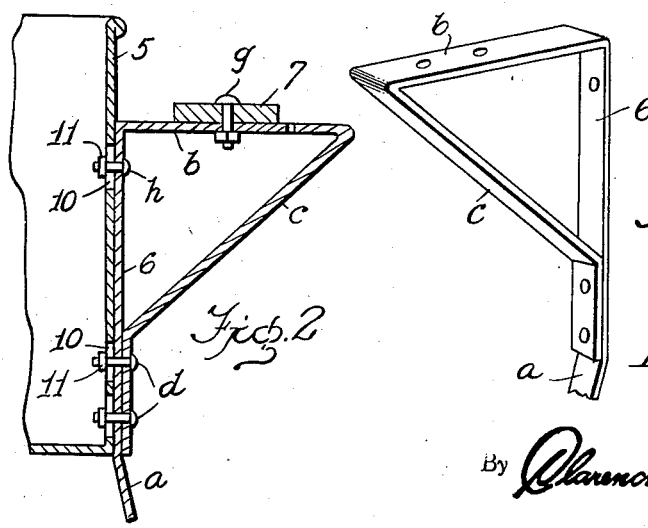
Inventor
L. I. Biledeou
By Clarence A. O'Brien
Attorney Patented Aug. 10, 1937

2,089,725

UNITED STATES PATENT OFFICE 2,089,725

POULTRY WATERER

Leo I. Biledeou, Frenchtown, N. J.

Application February 1, 1935, Serial No. 4,538

2 Claims. (Cl. 119—73)

This invention appertains to new and useful improvements in animal husbandry and more particularly to a novel poultry waterer.

The principal object of the present invention is to provide a drinking apparatus for poultry which can be readily heated in cold weather to prevent freezing of the water.

Another important object of the invention is to provide a poultry drinking apparatus which will afford a sanitary and convenient means for feeding poultry in cold weather.

Other important objects and advantages of the invention will become apparent to the reader of the following specification.

In the drawing:

Figure 1 represents a side elevational view of the structure.

Figure 2 represents a fragmentary vertical sectional view with the trough removed.

Figure 3 represents a perspective view of one of the platform brackets.

Referring to the drawing wherein like numerals designate like parts, it can be seen that the preferred form of the invention consists of a cylindrical upright container 5 which is provided with a plurality of strap iron legs 6 having outwardly diverged lower portions $a$. These strap iron legs 6 have laterally bent portions $b$, these portions being disposed outwardly in a radial direction with respect to the container 5 to provide support for the platform section 7. The strap iron members 6 are further bent downwardly as at $c$ and connect to the leg portions proper as at $c$, the portions $c$ serving as braces for the horizontal portions $b$, as in the manner substantially shown in Figure 2.

Each of the platform sections 7 includes a straight portion $e$ and diverged end portions $f$. The horizontal portions $b$ support the intermediate portions of the sections 7, the sections 7 being secured to the horizontal portions $b$ of the strap iron legs as at $g$.

Connecting plates 8 have their ends secured to the ends of the section 7 as shown in Figure 1 by suitable screw $s$ or other means 9, thus connecting the sections end to end in a continuous and endless platform circumscribing the container 5.

The members $d$ as well as the members $h$ which secure the legs 6 to the container 5, extend through slots 10 in the container and are equipped with nuts 11. Obviously, with the provision of these bolts $h$—$h$ and the nuts 11, along with the slots 10, the platform can be adjusted to various heights.

A vertically extending metal conduit 12 is suitably secured as at 13 to the side of the container 5 and a connection elbow 14 at its lower end, which elbow extends through an opening in the side of the container. Thus the conductor 24 is led to a suitable heater in the container 5 (not shown).

The apparatus is provided with an upwardly flaring water trough 22 which can seat within the upper open end of the container 5 in the manner shown in Figure 1. A conical shaped grill work or barring 23 is provided on the trough to keep the heads of the fowls separated while feeding.

While the foregoing specification sets forth the invention in specific terms it is to be understood that numerous changes in the shape, size and materials may be resorted to without departing from the spirit and scope of the invention as claimed hereinafter.

Having thus described the invention, what is claimed as new is:

1. In combination with a receptacle, an elongated leg member constructed of strap metal, having its upper portion disposed outwardly and then downwardly to provide a brace, the lower portion of the brace having a depending portion, and a securing member disposed through the last mentioned portion and through the upper portion of the leg and wall of the receptacle for holding these three parts firmly together.

2. In combination with a receptacle, an elongated leg member constructed of strap metal, having its upper portion disposed outwardly and then downwardly to provide a brace, the lower portion of the brace having a depending portion, a securing member disposed through the last mentioned portion and through the upper portion of the leg and wall of the receptacle for holding these three parts firmly together, said securing member consisting of a bolt having a nut thereon, said receptacle being provided with a vertically extending slot through which the bolt is disposed.

LEO I. BILEDEOU.